Sept. 20, 1955　　　A. R. LINTERN　　　2,718,037
VEHICLE FINNED TUBE HEATER AND DEFROSTER
Filed March 12, 1952　　　　　　　　　　2 Sheets-Sheet 1
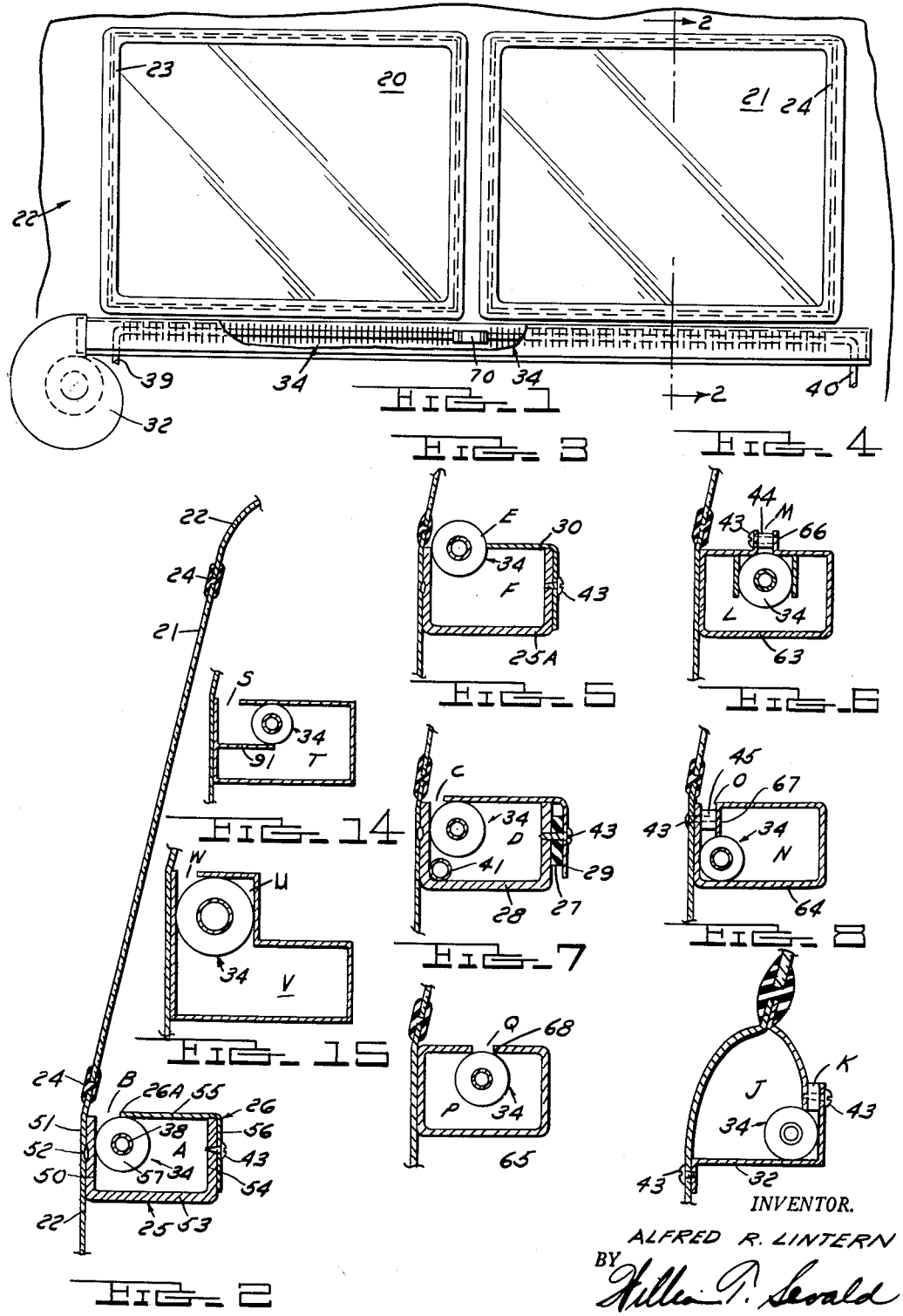
INVENTOR.
ALFRED R. LINTERN
BY
ATTORNEY

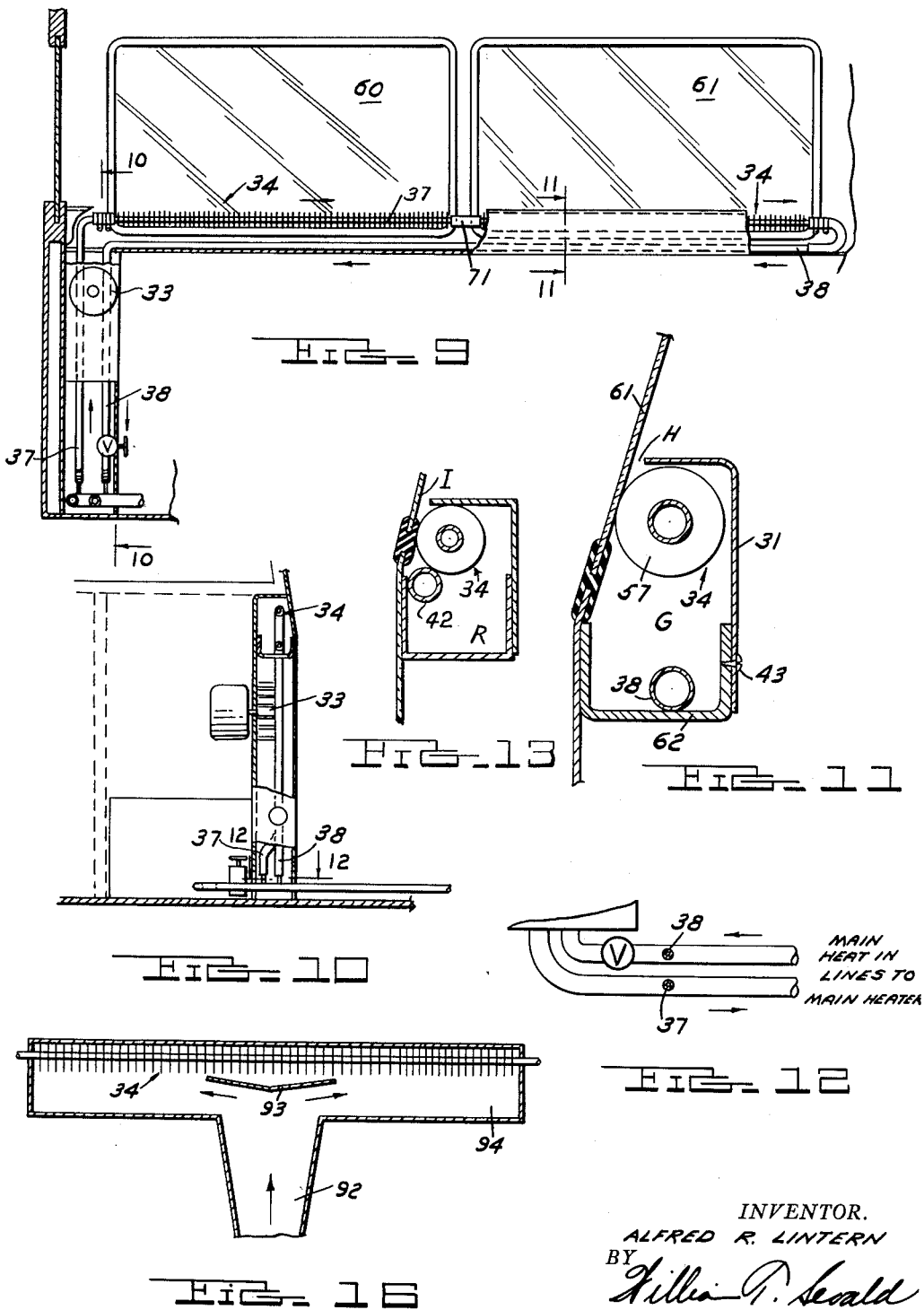

UNITED STATES PATENT OFFICE 2,718,037
Patented Sept. 20, 1955

2,718,037

VEHICLE FINNED TUBE HEATER AND DEFROSTER

Alfred R. Lintern, Detroit, Mich., assignor to A. R. Lintern, Inc., a corporation of Michigan Application March 12, 1952, Serial No. 276,130

9 Claims. (Cl. 20—40.5)

This invention relates to vehicle window defrosters and in particular to a window defroster optionally utilizing body structural members to define and form the air chamber and vent, and utilizing finned tubing at the vent to heat the air and to assist in regulating the air passing through the vent; and this invention is a continuation in part of my co-pending applications Serial No. 207,517, filed January 24, 1951, and Serial No. 257,141, filed November 19, 1951.

Vehicle window defrosters of the prior art have proven unsatisfactory as they are incapable of coextensive, adjustable distribution to eliminate "spotty" action and they usually require expensive duct work from a vehicle heater to supply them with heated air under pressure so that the inherent leaks and heat losses reduce the defroster efficiency below satisfactory performance. The prior art defrosters have usually been more or less heater "take-offs" and have therefore been entirely dependent on the body space heater for air and heat supply.

With the foregoing in view, it is a primary object of the invention to provide an integral vehicle window defroster capable of independent operation.

An object of the invention is to utilize body structural components to optionally form or partially form the defroster chamber and vent with but slight modification.

An object of the invention is to provide a chamber and vent which are substantially coextensive with the window area to be defrosted.

An object of the invention is to provide a vent which is easily variably adjustable as to dimension so that the vent dimension can be varied along its longitudinal extent in conjunction with pressure and velocity to deliver an even flow of air from one end to the other end of the device to obtain even and complete window area defrosting.

An object of the invention is to provide a finned-tube heating element in the defroster chamber against the vent to assist in evenly distributing the air flowing therethrough over the window area to be defrosted.

An object of the invention is to provide a finned-tube heating element in the chamber at the vent to heat and deliver air directly from the heating element on to the area of the window to be defrosted.

An object of the invention is to provide heating medium take-offs for the defroster ahead of the body space heaters to insure an adequate supply of hot water to the defroster.

An object of the invention is to deliver the air to the chamber at a substantially 90° angle to the fins on the finned-tubing so that the air must make a right angle turn from its direction of entrance to its direction of exit.

An object of the invention is to provide a variably adjustable vent in conjunction with the angle of air delivery and exit so that the vent can be adjustably widened at the entry point of the said vent to lower the vent resistance in the jet area of the air delivery to facilitate delivering air through the vent at the point of air introduction thereto when delivered at 90° to the fins.

An object of the invention is to provide a baffle or baffles to deflect air not delivered at 90° to the fins to a projected 90° travel to the fins.

An object of the invention is to deliver air to a duct at any angle to the duct or chamber in a non-vented portion of the chamber and to then deliver the air to the vented portion of the chamber at a 90° angle to the fins therein.

An object of the invention is to provide an air blower for exclusive use with the defroster.

An object of the invention is to provide a water circulation return tube within the duct so integrated as to constitute a desirable air baffle for effecting uniform air passage over the finned-tube conduit.

These and other objects of the invention will become apparent by reference to the following description of a vehicle window defroster embodying the invention taken in connection with the accompanying drawings, in which:

Fig. 1 is a partial inside elevational view of a vehicle windshield equipped with the invention; parts being broken away to show the internal structure.

Fig. 2 is a cross-sectional view of Fig. 1 taken on the line 2—2 thereof.

Figs. 3 to 8 are views similar to Fig. 2, showing various modifications of the invention.

Fig. 9 is a view similar to Fig. 1, showing a modified duct arrangement and the hot water connections.

Fig. 10 is a cross-sectional view of Fig. 9 taken on the line 10—10 thereof.

Fig. 11 is a cross-sectional view of Fig. 9 taken on the line 11—11 thereof.

Fig. 12 is a cross-sectional view of Fig. 10, taken on the line 12—12 thereof.

Fig. 13 is a view similar to Figs. 2 and 11, showing further modifications and the use of the water return hose as an air baffle in conjunction with the finned-tubing.

Fig. 14 is a cross-sectional view of a modified duct showing the finned-tubing spaced from the vent and a baffle channeling air to the finned-tubing and from the finned-tubing to the vent.

Fig. 15 is a cross-sectional view of a modified duct embodying a baffle or rest chamber for the finned-tubing; and Fig. 16 is a longitudinal sectional view of a modified duct showing air not delivered at 90° to the finned-tubing and a baffle deflecting the air to travel on projection of 90° to the finned-tubing.

Referring now to the drawing wherein like numerals refer to like and corresponding parts throughout the several views, the environment of the preferred and modified defrosters disclosed therein to illustrate the invention comprises vehicle windshield glasses 20 and 21 supported on the vehicle body 22 via the rubber interfitting grommets 23 and 24 respectively, which glasses, in this instance, constitute the window area to be defrosted. The defroster comprises a housing paralleling the window area to be defrosted adjacent its bottom constituting an air chamber, a longitudinal opening in the housing constituting a vent, a finned-tube air heating and air modulating element over the vent, and a blower for delivering air to the chamber.

In some embodiments of the invention, the members forming or partially forming the chamber and vent are structural parts of the vehicle body and in other embodiments of the invention, these parts or their equivalents are added to the vehicle.

More particularly, Figs. 1 and 2, the chamber 2 and and vent B are formed from body parts by using the U-channel 25 and L-shaped cover 26. In this instance, the edge 26A of the cover 26 is trimmed off to make the vent B. Fig. 5 shows a modification with resilient strip 27 disposed between the members 28 and 29 so that the vent C is formed by displacing the member 29 from normal. Fig. 3 shows a further modification wherein the cover 30 is trimmed off more than in Fig. 2 to make a larger vent E. Figs. 9 to 11 show a modification wherein the cover 31 is enlarged so as to make a large chamber with the vent H at the windows 60 and 61. Fig. 8 shows a reverse modification with the cover 32 below the chamber J and the vent K. Figs. 4, 6, 7, and 13 show chambers added to the body not employing body parts respectively defining chambers and vents L, M; N, O; P, Q; and R, S. Each of these devices are formed by making the chambers with spaced apart walls in a longitudinal area so as to define the vents. A blower 32, Fig. 1, or 33, Figs. 9 and 10, furnishes air under pressure to the chambers and the chambers liberate the air through the vents onto the area to be defrosted.

Finned-tubing 34 is disposed in the chambers A, F, L, O, J, N, P, R, and G with the fins 35 thereof covering the air path to the vents B, E, M, C, O, Q, K, S, and H so that air traveling from the chamber to the vent must first by-pass the fins 35 and the tube 36 of the finned-tubing 34 so that the liberated air is evenly distributed and evenly heated in the process. The tube 36 is furnished with hot water from the vehicle cooling system such as by hoses 37 and 38, Fig. 10, which are preferably cut into the main heating conduits ahead of the main heaters so that the defroster heater element short-circuits a certain amount of hot water thereby insuring the device with improved heating characteristics. The connections to the finned-tubing 34 may be as shown in Figs. 1 and 2 with the hoses 39 and 40 entering and leaving the chamber at either end thereof or the hoses may be installed at one end of the device with one hose leading back through the chamber such as seen in Figs. 5, 9, 11, and 13. It is to be noted in Figs. 5 and 13 that the return hoses 41 and 42 are used as baffles so as to prevent air short-circuiting through one side of the finned-tubing 34.

It can now be seen in Figs. 1, 2, 3, 5, 8, 9, and 11 that the defroster chamber and vent can be easily fabricated by using a U-channel member and an L-cover member and so adapting them in overlapping relationship that they are easily connected together by sheet metal screws 43. The vent is formed by spacing one side of the L-cover member or its equivalent from the far side of the U-channel, the glass, or their equivalent.

Resilient member 27, Fig. 5; resilient member 44, Fig. 4; resilient member 45, Fig. 6; or resilient member 47, Fig. 8 can be used in all instances to render the dimension of the vent adjustably variable by tightening or loosening the screws 43 so that uniform volume of air flow can be maintained regardless of the location of the blower 32 or 33.

The velocity of the air at the blower produces a jet of air at the first front of the duct so that the first portion of the vent is by-passed. Therefore, the first part of the slot or vent should be adjusted wider to overcome this characteristic.

The air must be delivered longitudinally of the duct at some point so that the air will travel in the duct at 90° to the finned-tube vents. The ideal for this is to send the air in at the end originally in a longitudinal direction. However, if the air is delivered at 360° or 180° to the finned-tube vents, the air should hit a baffle or a dead portion of the duct to turn the air to a direction of travel 90° to the vents. Otherwise, the air will drive through the vents at the point of introduction thereby leaving the vents remote therefrom without a supply of air resulting in uneven distribution and objectionable spotty action.

More particularly, Figs. 1 and 2, the air chamber A is defined at the glass by the front side leg or panel 50 which is secured to the cowl or window frame 51 by welding 52 or other suitable means; defined at the bottom by the bottom leg or panel 53 which connects laterally along its edge to the front side leg or panel 50; defined at the portion remote from the glass by the rear side leg or panel 54; and at the top by the leg or panel 55 of the L-shaped cover 26; the other leg or panel 56 of the L-shaped cover 26 overlaps the near side leg or panel 54 and is secured thereto by sheet metal screws 43 or other suitable means. The cover leg or panel 55 is of such width or extent that its foremost edge is spaced from the top edge of the front side leg or panel 50 so that the space therebetween constitutes the vent B. The finned-tubing 34 is located in the chamber A against the vent B so that the fins 57 thereof are in contact with both the cover leg or panel 55 and the front side leg or panel 50 so that air leaving the chamber A via the vent B must flow between the fins 57 and over the tube 58; the air so flowing is not only heated by the contact with the fins 57 and tube 58 but also must make a right angle turn as delivered by the blower as the blower delivers air lengthwise into the chamber A and the fins only allow air to escape sidewise from the chamber A. The characteristics of delivering the air longitudinally into the chamber A and venting the air laterally from the chamber A permits air to be fed to the entire chamber to place the entire chamber under a substantially equal pressure, such as in a plenum, before venting action occurs as the delivered air has no tendency to make a right angle turn to escape prior to head pressure setting up, which head pressure inherently sets up substantially equally and evenly over the entire length of the device giving equal venting of air against the glass or window to be defrosted. As the air is thereby delivered evenly past the finned-tubing, it is inherent that the air is evenly heated as the one end of the finned-tubing conduit is substantially as hot as the other end due to the fast rate of flow of hot water therethrough.

The structure of the devices of Figs. 3, 5, and 9 to 11 are similar to that of Figs. 1 and 2 in that the parts 25, 25A, 28, and 62 are similar and form three sides of the air chamber and the parts 26, 30, 29, and 31 are similar and form the other side of the air chamber and the vent. It is to be noted that the channels and covers overlap one another in these instances and that they are secured together in their overlapping area such as by the screws 43.

Figs. 4, 6, and 7 show modifications wherein the chamber and cover are integral and vent is formed by endwise or edgewise overlapping the members 63, 64, and 65 as at 66, 67, and 68.

The resilient adjusting medium 27 of Fig. 5 or a similar medium such as that of Figs. 4 and 6 can be interposed between the channel and the cover in the area of their overlap in any embodiments of the invention so that the vent can be adjusted as to width by compressing the resilient medium to advance the leading edge of the cover at the vent to narrow the vent as desired. Fig. 5 illustrates the use of the return water hose 41 in the chamber as a baffle in conjunction with the finned-tubing to equalize air travel distances through the finned-tubing 54 and this modification can be used with any embodiment of the invention as desired.

Referring more particularly to the inventive device illustrated in Figs. 9 to 12, it can be seen that the fins 57 are located against the glass 61 and that the cover 31 is much enlarged to create a larger chamber G and that the return hose 38 is led back through the chamber G.

Referring to the devices of Figs. 14 and 15, the finned-tubing can be positioned remote from the vent S and the baffle 91 employed to isolate one side of the finned-tubing 34 from the other relative to the vent S and chamber T so that air from the chamber T will pass over the tubing 34 to exit at the vent S. The device of Fig. 15 inherently embodies a baffle chamber U connecting to the chamber V; the vent W leads from the chamber U and the finned-tubing 34 rests in the chamber U so that air in the chamber V must travel over the finned-tubing 34 to exit at the vent W.

The device of Fig. 16 shows air delivered to the chamber X at 180° to the finned-tubing 34 by the intake 92 which contacts the baffle 93 which deflects the air to a 90° direction of travel relative to the finned-tubing 34; the baffle 93 being so formed to permit some air to by-pass same so that the portion of the finned-tubing behind the baffle is supplied with air while the major portion of the air is deflected to either end of the duct 94 or chamber X. Obviously, the intake 92 and baffle 93 can be selectively located or the air delivered to a "dead" or non-vented portion of the duct or chamber so that the air is deflected to travel at 90° to the finned-tubing 34.

It is to be particularly noted as very important that the finned-tube conduit 34 in all instances is located at the vent and that the conduit 34 evenly divides the air flowing from the chamber and evenly heats the air flowing from the chamber. Multiple sections of conduit 34 can also be used as seen in Figs. 1 and 9 by use of nipples 70 and 71 to bi-pass body parts, etc.

The invention eliminates the use of duct work from body heaters to defroster elements, and facilitates defroster installation regardless of location in the vehicle such as on the windshield, side windows, doors, or rear windows as water hose and electrical connections are easily made. Obviously, the inventive chamber, vent, and finned-tubing can also be employed with duct work from a main heater and blower if desired.

Although the invention has been shown and described in detail, it is obvious that many changes may be made in the size, shape, detail and arrangement of the elements of the invention within the scope of the appended claims.

I claim:

1. A vehicle window defroster having an elongated air distribution chamber for receiving air under pressure and an exhaust vent longitudinally thereof substantially coextensive therewith comprising walls defining and forming the sides, ends, and bottom of the chamber at the window to be defrosted, an elongated member substantially L-shaped in cross-section adapted to overlie in overlapping relationship one of said chamber walls and to partially bridge the space between said chamber walls defining the chamber sides so as to form and define the chamber top and the longitudinal vent, means interconnecting the overlapping portions of said side wall and member, and a finned-tube heating conduit in the chamber sidewise obstructingly positioned at the longitudinal vent so that air passing therethrough is passed necessarily sidewise through said conduit so as to heat and to distribute same evenly over the window area to be defrosted 2. A vehicle window defroster having an air distribution chamber for receiving air under pressure and an exhaust vent longitudinally thereof substantially coextensive therewith for liberating air therefrom against a window area to be defrosted comprising a first strip at the window forming and defining a chamber wall such as one side adjacent the window, a second strip interconnecting with said first strip extending outwardly from the window defining and forming a chamber wall such as the bottom, a third strip interconnecting with said second strip spaced oppositely from said first strip defining and forming a chamber wall such as the side remote from the window, and a fourth strip L-shaped in cross-section adapted via one leg thereof to overlap said third strip and to connect therewith and via the other leg thereof to partially bridge the space between said first strip and said third strip in sidewise spaced relation to said second strip to define a chamber wall such as the top and in edgewise spaced relationship to said first strip to define and form a vent therebetween adjacent the window to be defrosted, and a finned-tube heating element lengthwise disposed in the chamber and sidewise obstructingly disposed over the vent against the strips defining the vent so that air passes through the fins and over the core of said heating element to heat the air traveling to the vent and to aid in evenly distributing the air fed to the vent.

3. A vehicle window defroster comprising walls forming an air distribution plenum chamber for receiving and containing air under equalized pressure, separated walls forming an exhaust vent longitudinally thereof for liberating air therefrom against a window area to be defrosted, and a finned-tube heating medium conduit lengthwise disposed in said chamber and sidewise abuttingly and obstructively disposed against said separated walls over said vent so that air cannot leave said chamber via said vent unless it passes over said tube and equally between said fins to equally heat the air and equally deliver the air longitudinally of said vent.

4. In a vehicle heater, a duct defining an elongated plenum chamber, separated walls on said duct defining an elongated longitudinal vent, finned tubing disposed in said duct obstructively located over the vent and abuttingly positioned against said separated walls defining the vent so that air traveling from the chamber to and out of the vent necessarily passes between the fins and over the tube of said finned-tubing, hose connections from and to the vehicle motor supplying said finned-tubing with hot water, and a blower for delivering air to the chamber formed by said duct, said plenum chamber, said vent, and said obstructing finned tubing cooperating to equally deliver equally heated air longitudinally of said vent.

5. In a device as set forth in claim 4, said blower being adapted to deliver the air to the duct at 90° to the plane of said fins so that said air necessarily makes a right angle turn from the direction of travel in said duct to the direction of delivery to and travel past said fins to exit at the vent thereby assisting in accomplishing substantially even air flow past said fins and through the vent.

6. In a device as set forth in claim 5, said walls defining the vent being adjustable to vary the extent of the vent to facilitate adjusting air flow capacity of the vent at any point.

7. In a vehicle heater, a duct defining an elongated chamber, walls on said duct defining an elongated longitudinal vent, finned-tubing disposed in said duct located obstructively over the vent and positioned abuttingly against said walls defining the vent so that air traveling from the chamber to and out of the vent necessarily by-passes said finned-tubing, hose connections from and to the vehicle motor supplying said finned-tubing with hot water, and a blower for delivering air to the chamber formed by said duct; said blower being adapted to deliver air to the duct at an angle greater than 90° to the plane of said fins, and a baffle in said duct deflecting the air delivery to an angle of travel substantially 90° to the plane of said fins.

8. In a device as set forth in claim 7, a dead, non-vented portion of said duct constituting said baffle.

9. In a device as set forth in claim 7, said walls defining the vent being adjustable to vary the extent of the vent to facilitate adjusting air flow capacity of the vent at any point.

References Cited in the file of this patent

UNITED STATES PATENTS

| | | |
|---|---|---|
| 815,093 | Keeney | Mar. 13, 1906 |
| 1,712,154 | Mingo et al. | May 7, 1929 |
| 1,892,847 | Osgood | Jan. 3, 1933 |
| 2,173,893 | Wermich | Sept. 26, 1939 |
| 2,176,143 | Miller | Oct. 17, 1939 |
| 2,590,416 | Johnson | Mar. 25, 1952 |